US011405292B2

(12) United States Patent
Ovadia et al.

(10) Patent No.: US 11,405,292 B2
(45) Date of Patent: Aug. 2, 2022

(54) NETWORK MANAGEMENT, MONITORING, MODELLING, AND TROUBLESHOOTING OF COMMUNICATION GATEWAYS

(71) Applicant: Charter Communications Operating, LLC, St. Louis, MO (US)

(72) Inventors: Shlomo Ovadia, Denver, CO (US); Jay T. Liew, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 19 days.

(21) Appl. No.: 16/747,732

(22) Filed: Jan. 21, 2020

(65) Prior Publication Data
US 2021/0226867 A1    Jul. 22, 2021

(51) Int. Cl.
*H04L 43/065* (2022.01)
*H04L 43/0894* (2022.01)
*H04L 41/06* (2022.01)
*H04L 43/0852* (2022.01)
*H04L 43/50* (2022.01)
*H04L 12/28* (2006.01)

(52) U.S. Cl.
CPC ........ *H04L 43/065* (2013.01); *H04L 12/2856* (2013.01); *H04L 41/06* (2013.01); *H04L 43/0852* (2013.01); *H04L 43/0894* (2013.01); *H04L 43/50* (2013.01)

(58) Field of Classification Search
CPC .............. H04L 43/065; H04L 43/0852; H04L 43/0894; H04L 43/50; H04L 12/2856; H04L 41/06
USPC ........................................................ 709/224
See application file for complete search history.

(56) References Cited

U.S. PATENT DOCUMENTS

| | | | | |
|---|---|---|---|---|
| 2004/0255038 | A1* | 12/2004 | Kuroda | H04L 12/2818 709/229 |
| 2009/0147737 | A1* | 6/2009 | Tacconi | H04L 47/70 455/452.2 |
| 2015/0003507 | A1* | 1/2015 | Sturkovich | H04L 1/206 375/224 |
| 2015/0029869 | A1* | 1/2015 | Wolcott | H04L 43/50 370/242 |
| 2015/0163119 | A1* | 6/2015 | Dupre | H04L 43/0876 709/224 |
| 2015/0341379 | A1* | 11/2015 | Lefebvre | H04L 63/1425 726/22 |

* cited by examiner

*Primary Examiner* — James E Springer
*Assistant Examiner* — Patrick F Ngankam
(74) *Attorney, Agent, or Firm* — Armis IP Law, LLC

(57) ABSTRACT

A system includes multiple different types of monitor resources to monitor attributes of communication through a gateway of subscriber domain. The communication system receives identities of communication devices operated in a network of a subscriber domain and, via a first monitor resource, monitors traffic flow associated with the communication devices. A second monitor resource of the communication system monitors latency associated with communications from the gateway resource to the communication devices. A third monitor resource of the communication system monitors spectral energy in upstream and downstream ports of the communication system to determine a health of same. A communication management resource communicates the monitored information to a remote management resource that provides modeling, storage, and/or display of the respective monitor to a user.

29 Claims, 13 Drawing Sheets

NETWORK MANAGEMENT, MONITORING, MODELLING, AND TROUBLESHOOTING OF COMMUNICATION GATEWAYS

BACKGROUND

Conventional communications systems typically implement a two-box solution in residential deployments where one box is the Access CPE (Customer Premises Equipment) device (i.e., cable modem or a so-called Optical Network Unit or ONU), and the second box is a wireless router.

Cable companies do not have any visibility into a customer home network, including the wirelessly connected clients, and what is their bandwidth usage vs. time. Furthermore, in some cases, the subscriber owns the wireless router. In such an instance, the Access CPE device works in a bridge mode, which limits an ability to resolve any issues in the customer home network.

BRIEF DESCRIPTION OF EMBODIMENTS

Embodiments herein provide improved monitoring of a network of communication devices in a network environment.

More specifically, embodiments herein include a communication management resource operated in a gateway of a subscriber domain. The gateway provides a first network of one or more communication devices in the subscriber domain access to a remote network such as the Internet. The communication management resource (associated with the gateway) initially receives identities of the communication devices operated in the first network. Based on monitoring of the traffic such as data packets through the gateway, a monitor resource (such as executed by the communication management resource) associated with the gateway produces a set of traffic flow information associated with first network and the corresponding communication devices. In one embodiment, the communication management resource distributes the set of traffic flow information (associated with the first network and corresponding gateway) to a remote management resource in communication with the gateway.

In one embodiment, the remote management resource receives and analyzes traffic flow information from each of multiple different subscriber domains and corresponding gateways.

Note that the communication management resource can be configured to monitor any attributes associated with a respective subscriber domain. For example, as previously discussed, the communication management resource can be configured to monitor and track, via a first plugin or other suitable component, a bandwidth consumption associated with communication devices via monitoring of data packets conveyed through the gateway to or from the communication devices. Additionally, the communication management resource can be configured to monitor and track, via a second plugin or other suitable component, latency associated with communicating data packets from the first gateway to each of the communication devices. Yet further, the communication management resource can be configured to, via a third plugin or other suitable component, produce spectral information associated with signals received or transmitted over a communication link (such as upstream or downstream) with respect to the first gateway.

Note that, in a similar manner that the communication management resource communicates the traffic flow information to the remote management resource, the communication management resource communicates the latency information and spectral information to the remote management resource for processing.

The remote management resource can be configured to provide a viewable rendition of the set of traffic flow information, latency information, and/or spectral information associated with monitored subscriber domain to a respective technician analyzing operation of the first network. In certain instances, the communication management resource of the gateway receives attribute information (such as make, model, operating system, etc.) associated with each of the communication devices. In response to receiving the information associated with the communication devices in the subscriber domain, the communication management resource generates alias information associated with each of the communication devices. The communication management resource supplies the alias information associated with each of the communication devices to the remote management hardware. In such an instance, each of the corresponding monitored communication devices can be identified by a unique alias (name) instead of a respective network address (unique number value). This enables a respective technician to refer to a particular device instead of a network address not known to a user.

In still further example embodiments, the remote management resource receives and monitors traffic flow, latency information, and spectral information associated with multiple gateways in the network environment. Each of the multiple gateways provide a corresponding subscriber domain access to the remote network. In one embodiment, via the monitored traffic flow information (or other monitor information) received from the multiple gateways in different subscriber domains, the remote management resource derives a model. The model represents a model traffic flow, model latency, etc., associated with the multiple gateways.

In yet further example embodiments, the remote management resource produces a traffic flow profile from the set of traffic flow information obtained from monitoring the first network. The generated traffic flow profile captures attributes of the traffic flow of data packets associated with the first network of communication devices.

To determine a health status of the first network and corresponding subscriber domain, the remote management resource compares the traffic flow profile (derived from monitoring the first network) to the model derived from monitoring the multiple gateways in the different subscriber domains. Based on the comparing, and in response to detecting that performance of the first network as indicated by the set of traffic flow information is below a threshold value derived or determined from the model, the remote management resource produces a notification (such as alert) of a respective anomaly associated with the first network. In one embodiment, the notification indicates an anticipated failure or other assessment grade associated with the first network monitored by the first gateway. Thus, the mode can be used as a basis whether the monitored network in the subscriber domain provides sufficient performance to corresponding mobile communication devices.

Thus, embodiments herein include, via an analyzer engine associated with the remote management resource, analyze the set of traffic flow information received from the communication management resource monitoring the first subscriber domain; via analysis of the set of traffic flow information, determine a health status (such as performance) of the first network; and in response to detecting that the health status of the first network is below a threshold value, producing an alert indicating the health status of the first network.

In one embodiment, a respective user such as a technician initiates troubleshooting of the first network via communications to the communication management resource in the gateway of the first subscriber domain. For example, to test the subscriber domain and corresponding first network of communication devices, the user generates control information to the communication management resource of the gateway in of the first subscriber domain. In one embodiment, the communication management resource receives control input (the control information) indicating a test to be performed in the first network via the first gateway. In response to receiving the control input, the communication management resource in the first gateway executes the test as specified by the control input. The communication management resource then communicates results of the test from the first gateway to a remote destination.

Embodiments herein are useful over conventional techniques. For example, collection and distribution of different monitored information in the network environment enables proactive analysis of networks and troubleshooting of same without the need for physical presence of a technician at the cite.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: receive identities of communication devices operated in a first network, the first network disposed in a first subscriber domain and providing the communication devices access to a remote network through a first gateway of a network environment; based on monitoring of the data packets through the first gateway, produce a set of traffic flow information associated with first network and the communication devices; and distribute the set of traffic flow information to remote management hardware in communication with the first gateway.

Another embodiment herein includes a computer readable storage medium and/or system having instructions stored thereon. The instructions, when executed by the computer processor hardware, cause the computer processor hardware (such as one or more co-located or disparately processor devices or hardware) to: monitor traffic flow associated with multiple gateways in the network environment, each respective gateway providing a corresponding subscriber domain access to the remote network; derive a model from the monitored traffic flow associated with the multiple gateways, the model representing a standard traffic flow associated with the multiple gateways; produce a traffic flow profile from the set of traffic flow information associated with the first mesh network, the traffic flow profile representing traffic flow metrics associated with the first network of the communication devices; compare the traffic flow profile to the model derived from monitoring the gateways in the different subscriber domains; and based on the comparing, and in response to detecting that performance of the first network as indicated by the set of traffic flow information is below a threshold value derived from the model, produce a notification of a respective anomaly associated with the first network.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved connectivity to communication devices in a subscriber domain. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
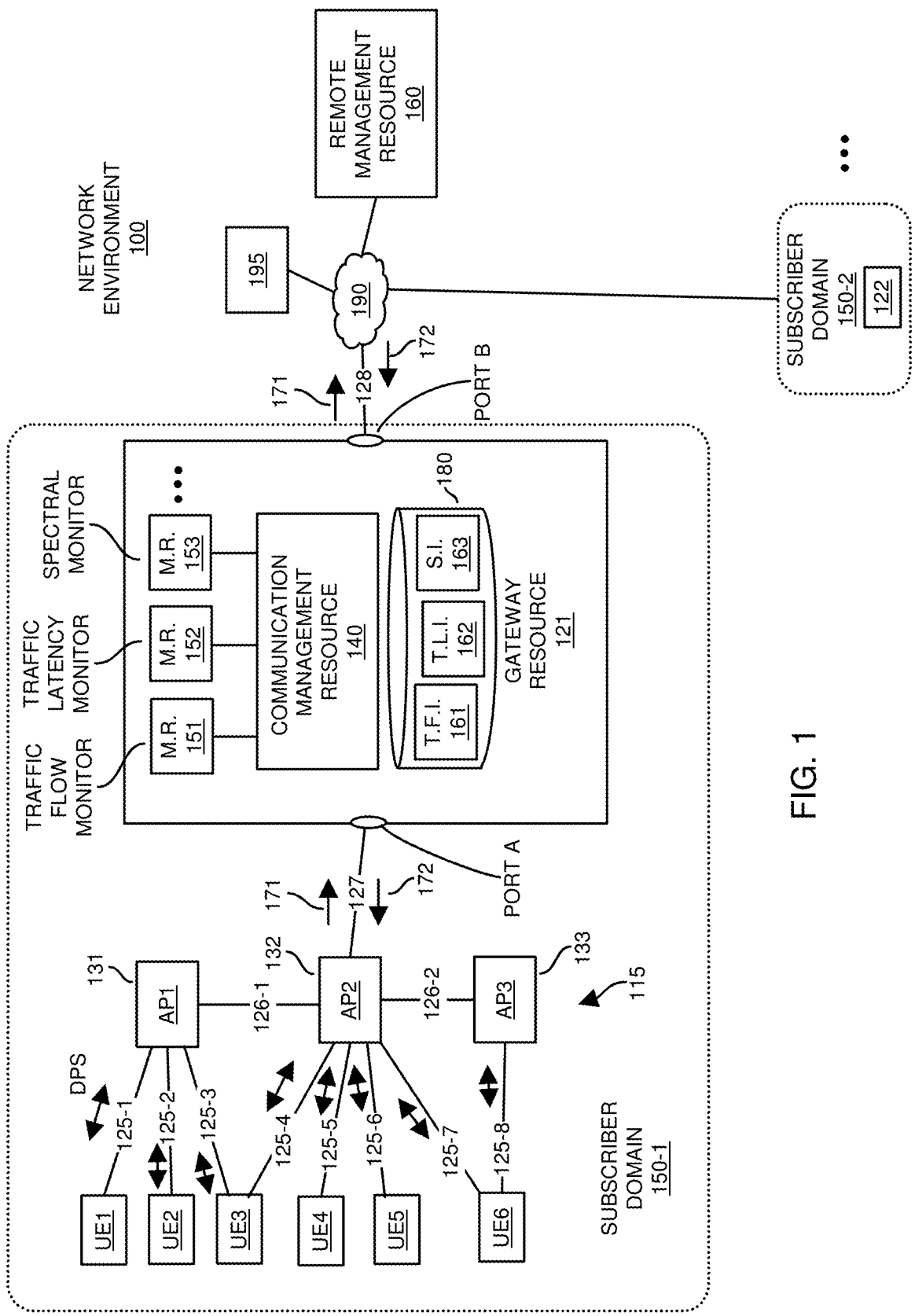
FIG. 1 is an example diagram illustrating collection of network data and distribution of same in a network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

Now, with reference to the drawings, FIG. 1 is an example diagram illustrating collection and distribution of data in a network environment according to embodiments herein.

In this example embodiment, the network environment 100 includes multiple subscriber domains 150 (such as subscriber domain 150-1, subscriber domain 150-2, etc.) and remote management resource 160.

As shown, subscriber domain 150-1 includes gateway resource 121 providing the user equipment or communication devices UE1, UE2, UE3, etc., and access points AP1, AP2, AP3, etc. (such as wired or wireless access points), connectivity to network 190 and corresponding server resources 195. For example, in an upstream direction, each of the communication devices (namely, communication devices UE1, UE2, etc., communicate data packets (DPS) through a respective access point and the gateway resource 121 to the server resources 195. In a reverse direction, the server resources 195 communicate data packets downstream over network 190 through the gateway resource 121 and access points to the respective communication devices.

In one embodiment, the network 115 is a mesh network where one or more of the communication devices has access to the remote network 190 via multiple different communications paths. For example, communication device UE3 has access to the network 190 via data packet communications through access point AP1 131 (via communication link 125-3) and AP2 132 (via communication link 126-1) through the gateway resource 121 to network 190; communication device UE3 has access to the network 190 via data packet communications through access point AP2 132 (via communication link 125-4) through the gateway resource 121 to network 190.

Access point AP2 132 is a root node coupled via communication link 127 (such as a bidirectional or two way Ethernet cable link) to port A of the gateway resource 121. Communication link 127 supports uplink transmission of data packets 171 from access point AP2 132 through gateway resource 121 to network 190; communication link 127 supports downlink transmission of data packets 172 from the gateway resource 121 to the access point AP2 132 to communication devices. Accordingly, each of the communication devices UE1, UE2, UE3, etc., has access to the network 190 via one or more communication links supporting upstream and/or downstream communications.

Note that one embodiment herein includes providing a better customer experience to user equipment in subscriber domain 150-1 by optimizing the corresponding customer's home network traffic for all the connected client devices (namely communication devices UE1, U2, UE3, etc.).

For example, in one non-limiting example embodiment, FIG. 1 is an example diagram of a customer's home mesh network (network 115). Communication management resource 140 can be implemented via any suitable resource such as OpenWrt-based D3.1 eMTA (embedded Multimedia Terminal Adapter) with access points AP1 131, AP2 132, AP3 133, etc., (such as WiFi™ Plume Pods™) providing mesh networking capability. In such a configuration the communication management resource 140 provides all the IPv4/v6 routing functionality, and the access points serve as wireless Access Points (such as AP1 131, AP2 132, AP3 133, etc.).

In accordance with further embodiments, a data collector open-source software component (i.e., monitor resource 151) called collectd is integrated into the communication management resource 140 (such as including a silicon middleware layer). The monitor resource 151 (such as called collectd) gathers metrics from various sources such as the gateway resource 121 and more specifically the operating system, applications, log-files, external devices, etc., associated with the gateway resource 121.

In one embodiment, the monitor resource 151 stores the collected information as traffic flow information 161 and, on an as-needed basis or in accordance with a distribution schedule, communicates the generated traffic flow information 161 associated with the communication devices UE1, UE2, UE3, etc., over network 190 to remote management resource 160 or other suitable entity.

In one embodiment, the statistics and/or flow information as captured by the traffic flow information 161 can be used to monitor systems in subscriber domain 150-1, find performance bottlenecks (i.e., for performance analysis) associated with components in the subscriber domain 150-1, predict future system loads (i.e., for capacity planning), etc.

Accordingly, the monitor resource 151 (such as collectd), which offers a variety of Plugins (software programs), is used to collect different types of telemetry data, typically from a router.

Thus, via monitor resource 151, the communication management resource 140 monitors traffic flow associated with each of the user equipment in the subscriber domain 150-1. For example, the monitor resource 151 produces traffic flow information 161 associated with each of the different communication devices (UE1, UE2, UE3, etc.) in the home network such as cell phones, game consoles, laptops, etc.

Figure 4:
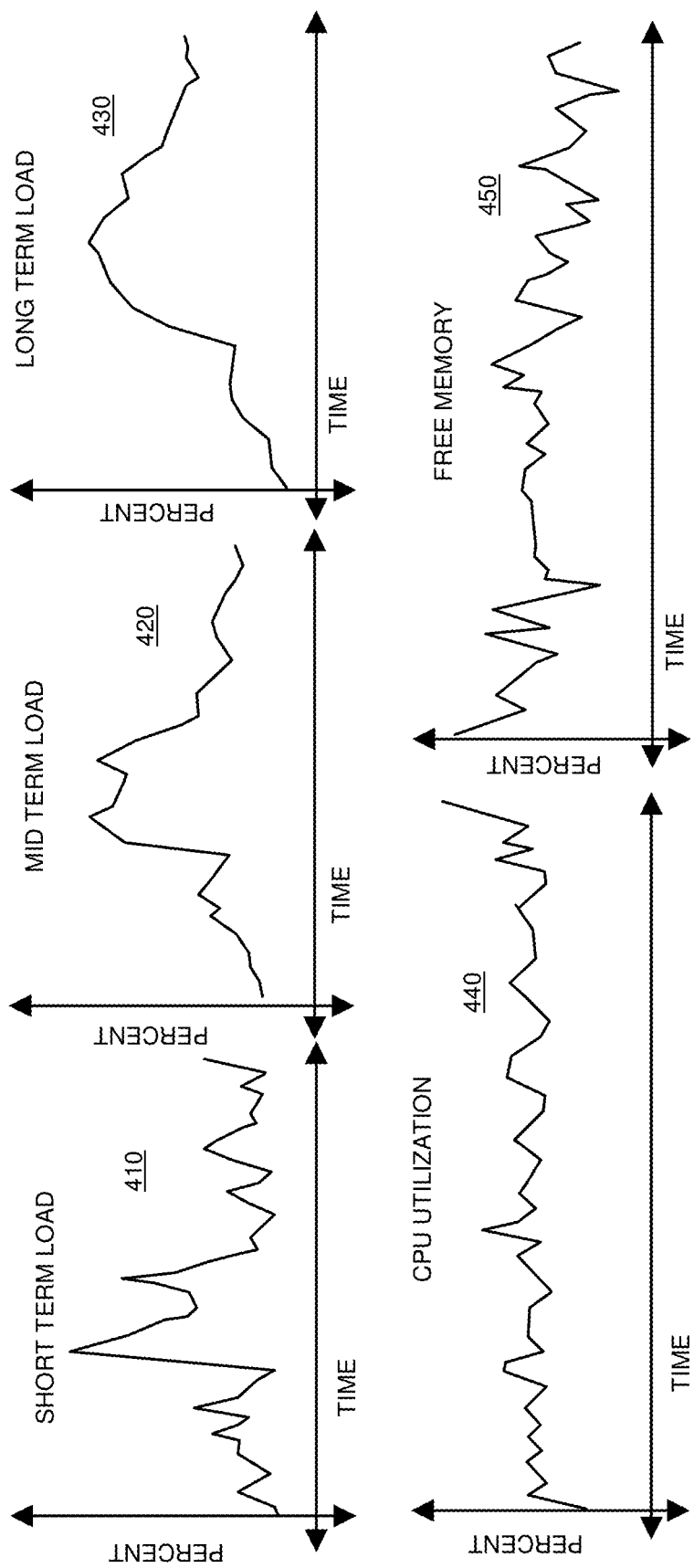
FIG. 4 is an example diagram illustrating status information associated with a communication monitor/management resource in a subscriber domain according to embodiments herein.

In addition to monitoring and producing traffic flow information 161, the monitor resource 151 (or other suitable entity) associated with communication management resource 121 produces performance metrics associated with the communication management resource 121 such as CPU utilization, memory utilization, system load, etc. (examples of the information is shown in FIG. 4).

Referring again to FIG. 1, in yet further embodiments, the gateway resource 121 includes monitor resource 152. During operation, the monitor resource 152 monitors one-way and/or round-trip latency associated with each of the different communication devices (UE1, UE2, UE3, etc.) in the home network 115. Monitoring of latency can include any suitable functionality including but not limited to generating a ping to a communication device (such as any of user equipment UE1, UE2, etc., any resource in network 190, etc.). For each ping, the monitor resource 152 monitors a round-trip time delay of communicating the ping and receiving the respective response from the communication device. The communication management resource 140 stores results of the ping tests as traffic latency information 162 in repository 180.

In one nonlimiting example embodiment, to achieve the above functionality of monitoring data packet flow and latency, the monitor resource 151 (collectd functionality, such as a first plugin) is implemented using a Linux bandwidth monitor utility tool called bwmon tool (http://bwmon.sourceforge.net/). The monitor resource 151 measures the bandwidth utilization associated with each communication interface in network 115 to gather and generate client statistics for each of the communication devices. In one embodiment, the monitor resource 151 (such as a plugin) produces the following traffic flow information based on monitoring of data packets through the gateway resource 121. For example, for each client (communication device UE1, communication device UE2, communication device UE3, etc.), via the traffic flow information 161, the monitor resource 151 keeps track of:

i) a number of data packets transmitted from the respective communication device through the gateway resource 121 to the network 190; the monitor resource 151 keeps track of when and how many data packets in any given time period (time range) are conveyed through the gateway resource 121 such that it is possible to determine how many data packets the respective communication device communicates through the gateway resource 121 for any time interval of interest;

ii) a number of data packets received in any given time period (time range) from network 190 and directed to respective communication device through the gateway resource 121 to the network 190. The monitor resource 151 keeps track of when and how many data packets are conveyed through the gateway resource 121 from the network 190 to the respective communication device such that it is possible to determine how many data packets the respective communication device receives through the gateway resource 121 for any time interval of interest;

iii) a total number of received or transmitted data packets associated with each of the communication devices for any given time interval.

In accordance with further embodiments, as previously discussed, the monitor resource 152 (such as a plugin associated with communication management resource 140) monitors latency associated with communications in network 115 to/from the communication devices (user equipment UE1, UE2, etc.) and stores such information as traffic latency information 162.

In one embodiment, the monitor resource 152 (such as latClient) sends pings to the connected clients to measure the round-trip latency from the connected client to the communication management resource 140. For example, at one or more scheduled times, the monitor resource 152 communicates a ping to the mobile communication device UE1 and measures a latency (round-trip time) associated with the network 115 conveying the ping and corresponding ping response from the target communication device UE1. In one embodiment, the round-trip time is a measure of the time difference between sending the ping and receiving the response from the communication management resource 140 to each of the communication devices (user equipment UE1, etc.).

At one or more scheduled times, the monitor resource 152 communicates a ping to the mobile communication device UE2 and measures a latency (round-trip time) associated with the network 115 conveying the ping and corresponding ping response from the target user equipment UE2 to the monitor resource 152. The round-trip time is a measure of the time difference between sending the ping and receiving the response from the corresponding user equipment UE2.

The monitor resource 152 repeats the latency test (ping test) to each of the communication devices over time and stores the generated round-trip time information associated with the different ping tests as traffic latency information 162. The monitor resource 152 may provide the average latency from different collected latency results in any given period of time.

Note further that in addition to monitor resource 151 and monitor resource 152, embodiments herein include monitor resource 153.

In one embodiment, monitor resource 153 is configured to perform a spectral analysis of RF (Radio Frequency) energy present on the downstream link 127 (such as viewed from gateway resource 121 through port A) and the upstream link 128 (such as viewed from gateway resource 121 through port B).

The monitor resource 153 produces information such as data telemetry RF spectrum metrics associated with the downstream link 127 and upstream link 128 and stores such information as spectral information 163.

As further discussed herein, the communication management resource 140 of gateway resource 121 can be configured to communicate any or all of the collected data (such as traffic flow information 161, traffic latency information 162, spectral information 163, etc.) to a respective technician or diagnostic tool (such as dashboard) for further analysis and/or troubleshooting associated with the network 115 in subscriber domain 150-1.

During operation, note that the communication management resource 140 and monitor resource 151 identifies to which client (i.e., user equipment UE1, UE2, UE3, etc.) each of the received data packets 171 are directed from any of communication devices (or server resources 195) in the network 190 based on a corresponding destination network address (IP address, MAC address, etc.) in the downstream data packets 172.

In one embodiment, the communication management resource 140 and monitor resource 151 identifies from which client communication device each of the inspected data packets 171 (passing through the gateway resource 121) are transmitted from through the network 115 based on a corresponding source network address (IP address, MAC address, etc.) in the upstream transmitted data packets 171. The communication management resource 140 and monitor resource 151 identifies from which client communication device each of the data packets 172 is directed to through the network 115 based on a corresponding destination network address (IP address, MAC address, etc.) in the downstream transmitted data packets 172.

In yet further example embodiments, note that an agent (such as a CUJO™ AI agent) can be installed on the communication management resource 140 with routing functionality, then the finger printing of the connected clients in the home network can be performed. This means that the identity with a logo (or symbol indicative of the type or identity) of the corresponding communication device (such as communication devices UE1, UE2, UE3, etc.) can be determined. Use of identity and/or s specific logo is useful for indicating specific communication devices instead of using respective network addresses, which may not be known to a user.

Note that collection, generation, and subsequent distribution of the data telemetry information as described herein (such as monitored parameters captured by traffic flow information 161, traffic latency information 162, and spectral information 163) enables the service provider and corresponding technician associated with the gateway resource 121 to perform downstream and upstream speed or other types of tests for each connected client device (communication devices UE1, UE2, etc.).

In one embodiment, the communication management resource 140 communicates the collected data (traffic flow information 161, traffic latency information 162, and spectral information 163) via telemetry communications to the remote management resource 160 for real-time ingestion and/or analysis by or other suitable entities. Further details of remote management resource 160 are presented in FIG. 2 and corresponding text.

Figure 2:
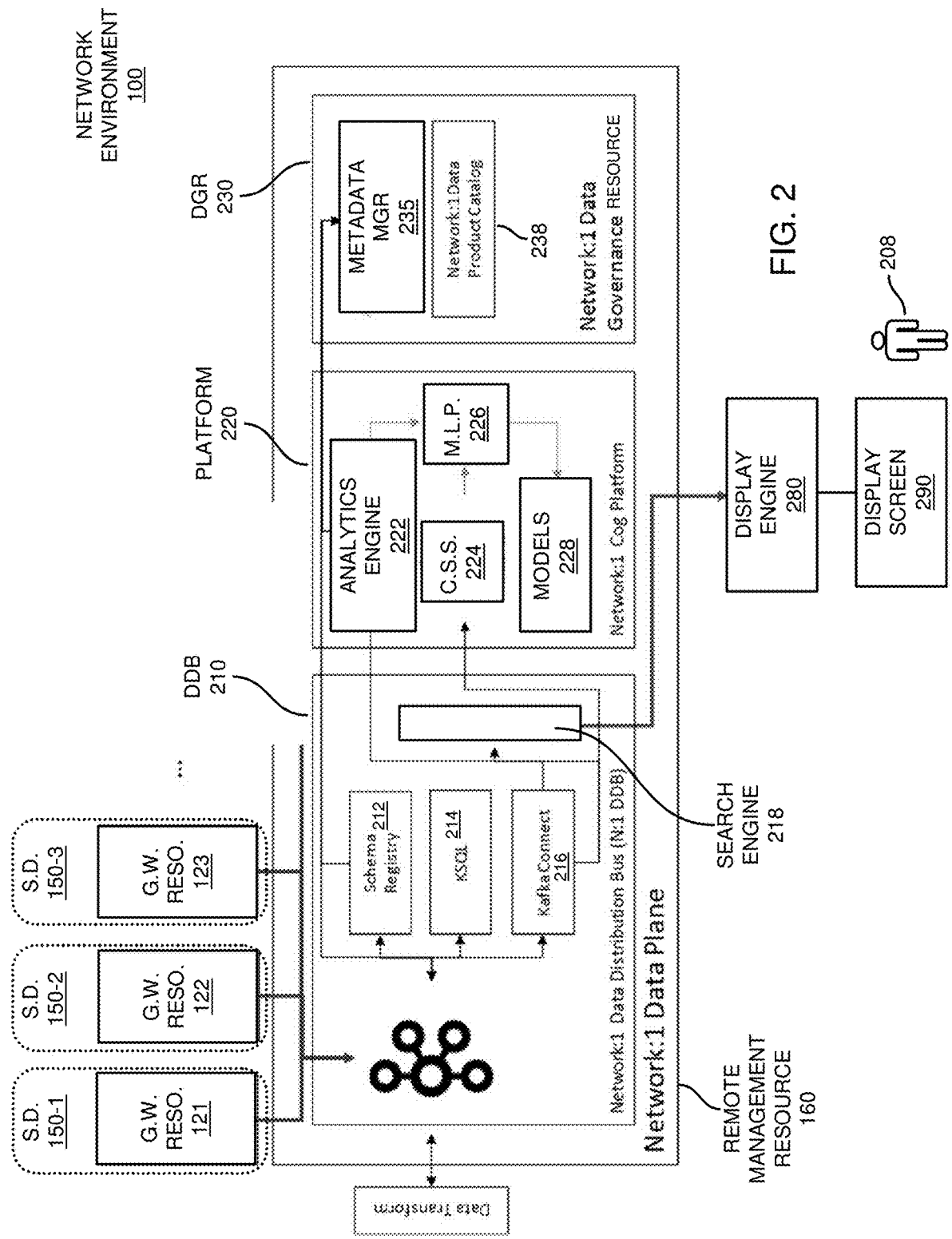
FIG. 2 is an example diagram illustrating monitoring of multiple subscriber domains and corresponding collection of data and distribution of the collected data to a remote management resource for processing according to embodiments herein.

FIG. 2 is an example diagram illustrating monitoring of multiple subscriber domains and corresponding collection of data and distribution to a remote management resource for processing according to embodiments herein.

As shown, network environment 100 includes remote management resource 160 (such as a data telemetry platform for OpenWrt Access CPE devices). The remote management resource 160 (such as a Network:1 (N:1) Data Plane) includes an N:1 platform 220 (such as a Cog Platform), Data Distribution Bus 210 (DDB), and Data Governance resource 230.

The N:1 DDB 210 is the initial point of data (such as traffic flow information 161, traffic latency information 162, and spectral information 163) ingestion from each of the gateway resources 121, 122, etc., in the different subscriber domains 150-1, 150-2, 150-3, etc.

In one embodiment, the data distribution bus is driven by Apache Kafka™, although this can be any suitable resource. Note that the N:1 DDB 210 is also the initial system, where all data is classified as a data asset. Any raw data that is not governed as dictated by the N:1 Data Governance resource 230 standards will be transformed for compliance with the standards. In one embodiment, the data that is participating in distribution complies with the standards.

In accordance with further embodiments, the N:1 DDB 210 also provides a real-time event stream processing capability in KSQL resource 214. Received data from subscriber domains can be transformed further by the joining of additional streams ingested. Kafka Connect 216 provides the capability to distribute data to remote database sinks, via search engine 218 (such as Elastic Search or MySQL). In one embodiment, the N:1 DDB 210 is designed to provide quick, immediate feedback, represented by time-series visualizations, of streaming data, using Analytics visualization tools via display engine 280 such as Grafana™ or other suitable resource.

Yet further, the Network:1 Platform 220 provides the capability to construct intelligent datasets (a.k.a., Analytics Datasets or ADS). In accordance with further example embodiments, governed Data from the N:1 DDB 220 is funneled into Analytic Databases such as via analytics engine 222 (such as implemented via Snowflake, or Cloud data stores such as S3) in the N:1 Platform 220, for construction of ADSs. In one embodiment, the ADSs are datasets that are engineered, curated, versioned, and watermarked for maximum data integrity. Advance, high ROI, AI models are built using ADS data for Machine Learning use cases.

In accordance with further example embodiments, the N:1 Data Governance resource 230 (which includes metadata manager 235 such as implemented via Apache Atlas or other suitable resources) is an AE Standard that provides guidance on how data is produced and consumed in the N:1 Data Plane associated with the remote management resource 160. Metadata manager 235 stores metadata for all received data, allowing translation. The N:1 Data Plane views data that is in motion or at rest as data assets. Metadata from these data assets are used to construct the N:1 Data Product Catalog 238, that properly documents and catalogs every governed topic in the N:1 DDB 210 and ADS in the N:1 Platform 220. These data assets are used to drive high ROI (Return on Investment) use cases across the service provider's Enterprise.

Note further that, in one embodiment, the collected traffic data from each client (such as communication devices UE1, UE2, UE3, etc.) is sent to service provider's Apache Kafka open-source monitoring tool using a write_kafka plugin. Using the display engine 280 (such as Grafana graphical tool), the collected metrics associated with the user equipment and/or gateway resource can be displayed on a customized dashboard (graphical user interface) for each user 208 (such as a technician) that troubleshoots over oversees operation of the respective gateway resources and/or communication devices (such as user equipment, access point, etc.) in the subscriber domains.

Thus, in one embodiment, communication management resource 140 operates in a gateway 121 of subscriber domain 150-1. The gateway resource 121 provides a first network 115 of one or more communication devices UE1, UE2, UE3, etc., in the subscriber domain 150-1 access to a remote network 190 such as the Internet. The communication management resource 140 initially receives identities of the communication devices UE1, UE2, UE3, etc., operated in the first network 115. Based on monitoring of the data packets through the first gateway 121 in a manner as previously discussed, via monitor resource 151, the communication management resource 140 of the gateway resource 140 produces a set of traffic flow information 161 associated with first network and the communication devices. The communication management resource 140 distributes the set of traffic flow information 161 to the remote management resource 160.

In one embodiment, the remote management resource 160 and corresponding associated components receives and analyzes traffic flow information and any other generated status information from each of multiple different subscriber domains 150-1, 150-2, 150-3, etc.

Note that the communication management resource 140 can be configured to monitor any attributes associated with a respective subscriber domain 150-1. For example, as previously discussed, the communication management resource 140 can be configured to monitor and track, via a first plugin (monitor resource 151), a bandwidth consumption associated with communication devices UE1, UE2, etc., via monitoring of data packets conveyed through the gateway resource 121 to or from the communication devices UE1, UE2, UE3, etc.

Additionally, the communication management resource 140 monitors and tracks, via a second plugin (monitor resource 152), latency associated with communicating data packets from the first gateway resource 121 to each of the communication devices UE1, UE2, UE3, etc.

Yet further, the communication management resource 121, via a third plugin monitor resource 153, produces spectral information associated with the signals (carrying data packets and other information) received and/or transmitted over a respective communication link (such as upstream via port B or downstream via port A) with respect to the first gateway resource 121.

In a similar manner that the communication management resource 140 communicates the traffic flow information 161 to the remote management resource 121, the communication management resource 121 communicates the latency information 162 and spectral information 163 to the remote management resource 163 for processing, analysis, storage, display, etc.

In one embodiment, the remote management resource 140 is further configured to provide a viewable rendition of the set of traffic flow information 161, latency information 162, and/or spectral information 163 to a respective technician (user 208) analyzing operation of the first network 115. In certain instances, the communication management resource 140 of the gateway resource 121 receives attribute information (such as make, model, operating system, etc.) associated with each of the communication devices UE1, UE2, UE3, etc. In response to receiving the information associated with the communication devices in the subscriber domain 150-1, the communication management resource 140 generates alias information associated with each of the communication devices (UE1, UE2, UE3, etc.).

The communication management resource 140 supplies the alias information associated with each of the communication devices to the remote management hardware 160. In such an instance, each communication device in a subscriber domain can be identified by a unique alias (name) instead of merely a respective network address (unique number value). This enables a respective technician (such as user 208) to refer to a particular device in the network 115 via the alias (more likely known to the subscriber) instead of a network address not known to a respective subscriber that the user 208 is trying to assist.

In still further example embodiments, the remote management resource 160 monitors traffic flow, latency information, and spectral information associated with each of multiple gateways in the network environment 100. Each of the multiple gateways provides a corresponding subscriber domain access to the remote network.

In accordance with further example embodiments, via the monitored traffic flow information (and/or any other monitored information) received from the multiple gateways, the remote management resource derives a model. The model represents a model of a respective attribute associated with the multiple gateways.

In yet further example embodiments, the remote management resource produces a traffic flow profile from a set of traffic flow information obtained from monitoring the first network 115. The generated traffic flow profile captures attributes of the first network (such as monitored) traffic flow of data packets associated with the first network of communication devices.

In one embodiment, a combination of the analytics engine 222 (analytics database such as Snowflake™), cloud storage service 224, and machine learning platform 226 generate one or more models 228 associated with monitored data. In one embodiment, the models serve as a way to identify normal or healthy attributes of a respective subscriber domain. The one or more models 228 can be derived based on any of one or more monitored parameters associated with the subscriber domains and corresponding networks.

In yet further example embodiments, to determine a health status of the first network 115 and corresponding subscriber domain 150-1, the components of the remote management resource 160 can be configured to compare the traffic flow profile (or other suitable information associated with a subscriber domain) to the model derived from monitoring the multiple gateways in the different subscriber domains. Based on the comparing, and in response to detecting that performance of the first network 115 as indicated by the set of traffic flow information 161 is below a threshold value derived from the model, the remote management resource 160 produces a notification of a respective anomaly associated with the first network 115. In one embodiment, the notification indicates an anticipated failure or other assessment associated with the first network monitored by the first gateway.

In one embodiment, a respective user 208 such as a technician initiates troubleshooting of the first network 115 via communications to the remote management resource 160 and/or communication management resource 140 in the gateway of the first subscriber domain. For example, to test one or more particular attributes of the subscriber domain 150-1 and corresponding first network 115 of communication devices, the user 208 generates control information to the communication management resource 140 of the gateway in the first subscriber domain. In one embodiment, the communication management resource receives the control input (control information) indicating a test to be performed in the first network 115 via the first gateway resource 121. In response to receiving the control input, the communication management resource 140 in the first gateway resource 121 executes the test as specified by the control input. The communication management resource 160 then communicates results of the test from the first gateway resource to a remote destination such as remote management resource 160 and/or display screen 290 for viewing by the user 208.

In accordance with further embodiments, the traffic flow information 161, traffic latency information 162, spectral information 163 is available for retrieval and viewing on a display screen at any location. In one embodiment, the traffic flow information 161, traffic latency information 162, spectral information 163 is available to a subscriber in the subscriber domain 150-1 for analyzing the network 115. Accordingly, the subscriber in subscriber domain 150-1 is able to troubleshoot a problem using the display tools and graphical user interface (FIGS. 3-10) as further discussed below.

Figure 3:
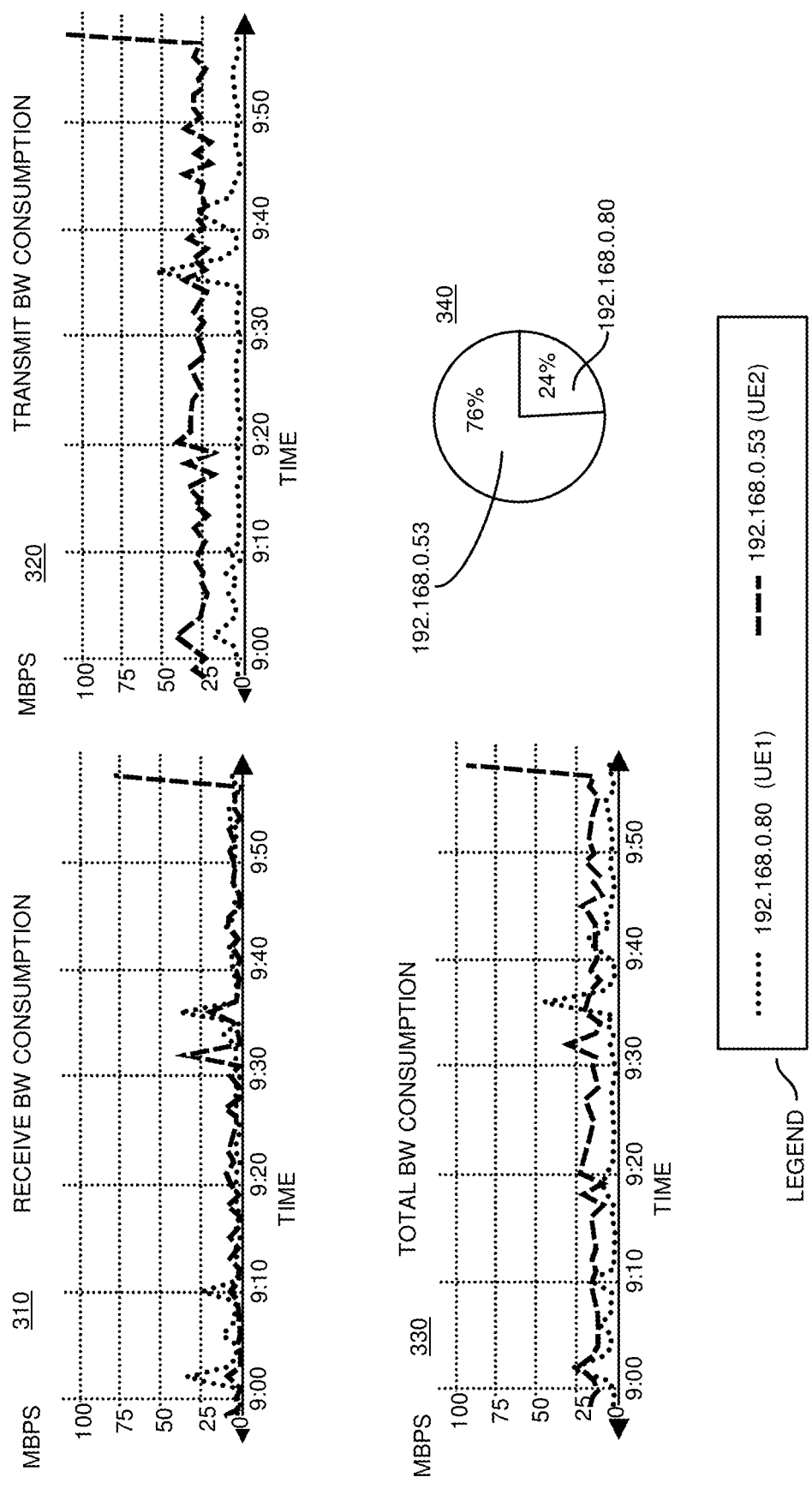
FIG. 3 is an example diagram illustrating a display of collected data derived from monitoring traffic flow in a subscriber domain according to embodiments herein.

FIG. 3 is an example diagram illustrating a display of collected data derived from monitoring traffic flow in a subscriber domain according to embodiments herein.

In this example embodiment, the following graphs 310, 320, 330, and 340 are derived from data flow monitoring and corresponding traffic flow information 161 produced by monitor resource 151 in subscriber domain 150-1.

More specifically, graph 310 indicates the bandwidth consumption/usage (mega-bits per second) associated with communication device UE1 and communication device UE2 in the downlink direction from the network 190 through the gateway resource 121 of subscriber domain 150-1 to the communication devices. For example, as previously discussed, the monitor resource 151 monitors the flow of traffic to each of the communication devices UE1 and UE2 via inspecting destination network addresses associated with received data packets. Graph 310 represents downlink bandwidth consumption derived from traffic flow information 161 for each of the communication device UE1 (network address 192.168.0.80) and communication device UE2 (network address 192.168.0.53).

Graph 320 indicates the bandwidth consumption/usage (mega-bits per second) associated with communication device UE1 and communication device UE2 in the uplink direction from the respective communication device through the gateway resource 121 to a target destination on network 190. For example, as previously discussed, the monitor resource 151 monitors the flow of traffic from each of the communication devices UE1 and UE2 through the gateway resource 121 via inspecting a source network address associated with received data packets. Graph 320 represents uplink bandwidth consumption derived from traffic flow information 161 for each of the communication devices UE1 (network address 192.168.0.80) and UE2 (network address 192.168.0.53).

Graph 330 indicates the total bandwidth consumption/usage (mega-bits per second) associated with communication device UE1 and communication device UE2. For example, the total bandwidth consumption associated with the communication device UE1 is a sum of the downlink bandwidth consumption for communication device UE1 in graph 310 and uplink bandwidth consumption for communication device UE1 in graph 320. The total bandwidth consumption associated with the communication device UE2 is a sum of the downlink bandwidth consumption for communication device UE2 in graph 310 and uplink bandwidth consumption for communication device UE2 in graph 320.

Graph 340 illustrates a pie chart of bandwidth consumption associated with the 1 hour of displayed bandwidth usage amongst communication device UE1 and communication device UE2. For example, as indicated by the graph 340, communication device UE1 (assigned network address 192.168.0.80 consumes 24 percent of the overall consumed bandwidth; communication device UE2 (assigned network address 192.168.0.53 consumes 76 percent of the overall consumed bandwidth.

In accordance with further example embodiments, performance parameters from the OpenWrt Access CPE device can also be streamed to the display engine 280 (such as Grafana tool) via the Kafka platform as shown in FIG. 2.

FIG. 4 is an example diagram illustrating status information associated with a communication monitor resource in a subscriber domain according to embodiments herein.

In one embodiment, the communication management resource 140 collects status information associated with the gateway resource 121 that is communicated to the remote management resource 160. If desired, a respective user 208 is able to view different operating attributes associated with the gateway resource 121 over one or more different time intervals.

For example, based on information received from the communication management resource 140 and displayed on the display screen 290 via display engine 280, graph 440 illustrates the average CPU usage by the communication management resource 140 over time; graph 450 illustrates free memory utilization in a selected time interval (such as a time interval of 30 seconds in this case, although the time interval can be any suitable selected value) associated with communication management resource 140 over time; graph 410 illustrates the average system load associated with the communication management resource 140 at short-term (30 seconds) over time; graph 420 illustrates the mid-term load (300 seconds) associated with communication management resource 140 over time; and long-term load (900 seconds) associated with communication management resource 140 over time.

Note that the average load and CPU utilization are two different things. For example, load average is a measurement of how many tasks are waiting in a kernel run queue (not just CPU time but also disk activity) over a period of time. CPU utilization is a measure of how busy the CPU is at the current instant of time (i.e., right now).

Figure 5:
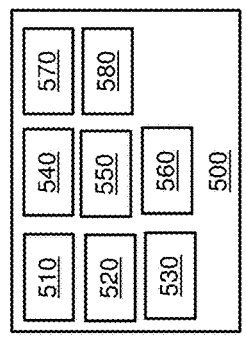
FIG. 5 is an example diagram illustrating display of status information provided by a communication management resource according to embodiments herein.
Figure 5:
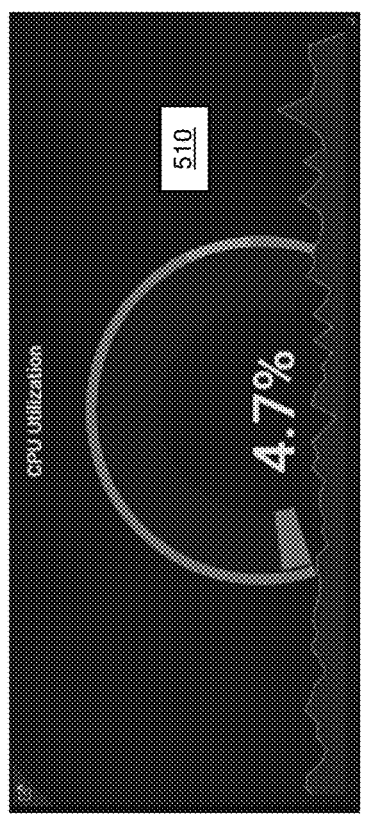
Figure 5:
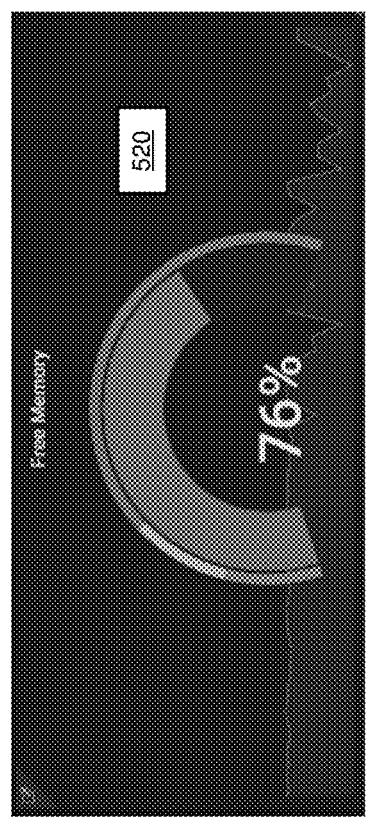
Figure 5:
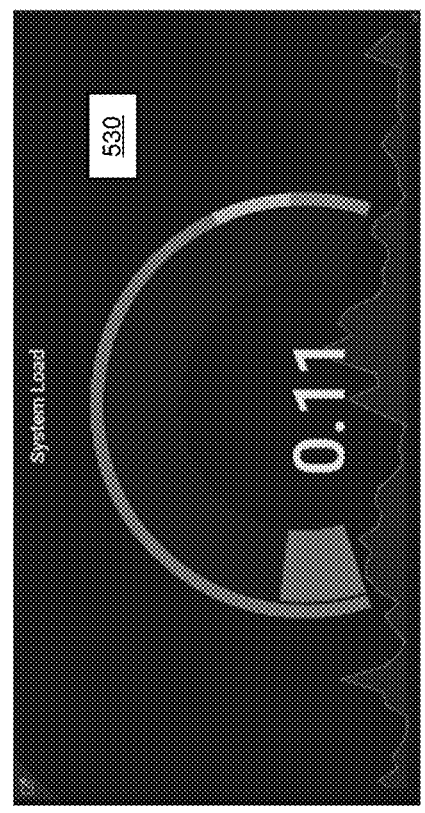
Figure 6:
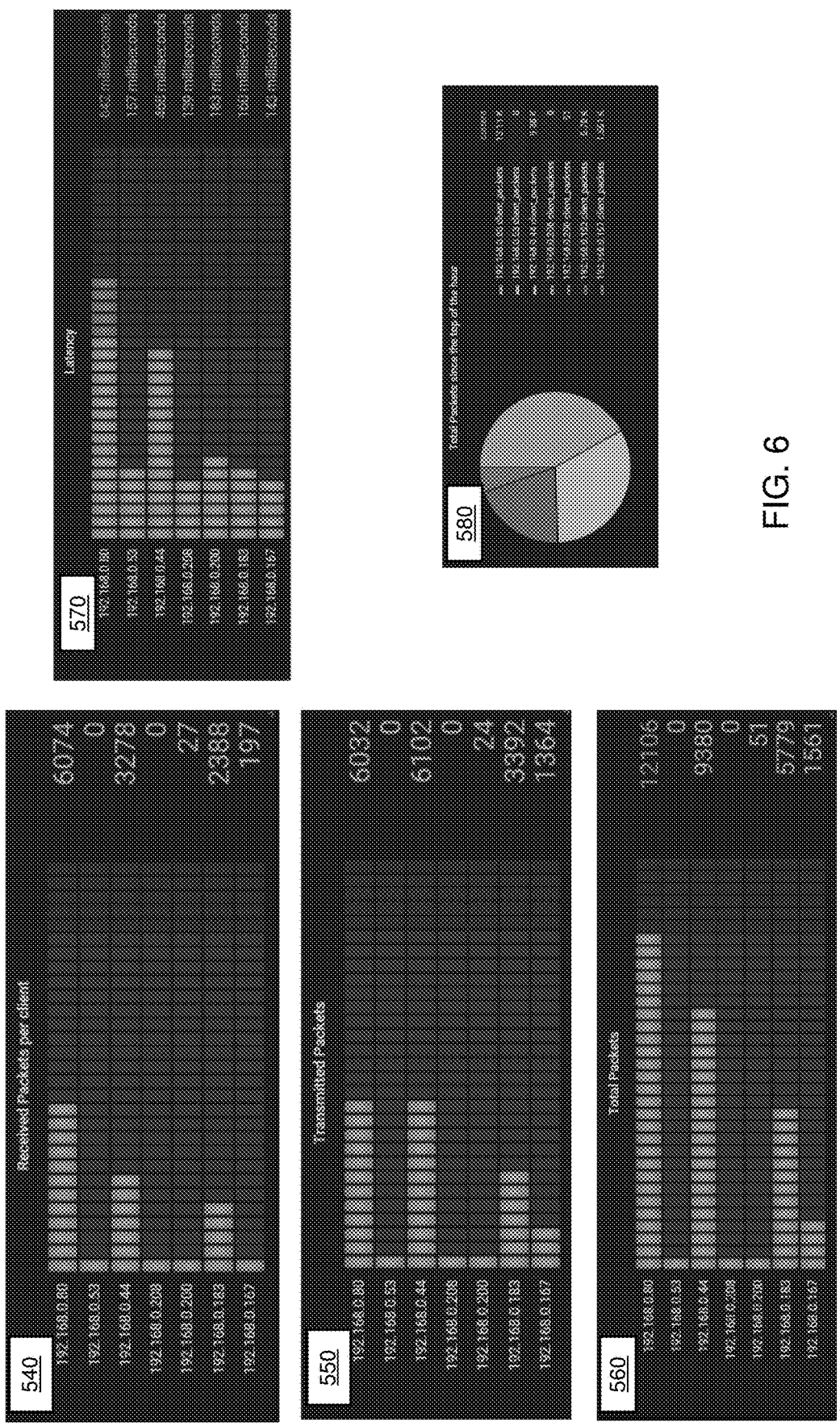
FIG. 6 is an example diagram illustrating display of collected data derived from monitoring traffic flow from different communication devices in a subscriber domain according to embodiments herein.

FIG. 5 is an example diagram illustrating display of collected data derived from monitoring traffic flow in a subscriber domain according to embodiments herein.

Note that, in accordance with further embodiments, the data telemetry information (such as traffic flow information 161, traffic latency information 162, spectral information 163, etc.) from the communication management resource 140 of gateway resource 121 and all the customer's connected clients (such as communication devices UE1, UE2, UE3, etc.) can not only be used by the service provider's Product and/or Data Analytics teams, but also used by the service provider's customers via an appropriate display application such as shown in FIG. 5.

In further example embodiments, FIG. 5 shows, for example, a high-level view of the customer home network health status dashboard 500 displayed by display engine 280 on display screen 280. The dashboard 500 (derived from traffic flow information 161 and displayed on display screen 290 to user 208) is organized in a hierarchical manner including graph 510, graph 520, graph 530, graph 540, graph 550, graph 560, graph 560, graph 570, and graph 580.

Graph 510 illustrates CPU utilization 4.7% associated with the communication management resource 140 in gateway resource 121. In one embodiment, the graph 510 indicates an 80% threshold value (such as green) and a 90% threshold value (such as red) of CPU utilization show using different colors.

Graph 520 illustrates free memory (76%) associated with the communication management resource 140 in gateway resource 121. In one embodiment, the graph 520 indicates an 15% threshold value (such as red) and a 30% threshold value (such as yellow) of free memory show using different colors.

Graph 530 illustrates system load (0.11 or 11% of maximum load) associated with the communication management resource 140 in gateway resource 121. In one embodiment, the graph 510 indicates an 80% threshold value (green) and a 90% threshold value (red) of system load show using different colors.

Each wirelessly-connected client device (communication devices UE1, UE2, UE3, etc.) is identified based on its network address (such as IP address or MAC address), although any suitable symbol can be used to indicate which displayed data information pertains to which communication device. For example, communication device UE1 is assigned network address 192.168.0.80; communication device UE2 is assigned network address 192.168.0.53; communication device UE3 is assigned network address 192.168.0.44; communication device UE4 is assigned network address 192.168.0.208; communication device UE5 is assigned network address 192.168.0.200; and so on. As previously discussed, the network address information associated with the dashboard 500 can be replaced or supplemented with a symbol (such as alias) indicating attributes of the corresponding communication device.

The connected device health parameters level 1 include, for example, multiple graphs displaying different attributes associated with the communication management resource 140 and communication devices associated with the subscriber domain 150-1. Graph 540 (in FIG. 6) illustrates a number of packets over a selected period of time (i.e., the last hour) received by each corresponding communication device from the communication management resource 140. The duration of information being viewed in graph 540 can be selected and changed by the user 208.

Graph 550 (in FIG. 6) illustrates a number of transmitted packets over a selected period of time (i.e., the last hour) by each corresponding communication device to the communication management resource 140. The duration of information being viewed in graph 550 can be selected and changed by the user 208.

Graph 560 (in FIG. 6) illustrates a total number of packets over a selected period of time (i.e., the last hour) transmitted and received by the connected device to the communication management resource 140. The duration of information being viewed in graph 550 can be selected and changed by the user 208.

Graph 570 (in FIG. 6) illustrates round-trip latency associated with communications from the monitor resource 152 to communication devices over a selected period of time. The duration of information being viewed in graph 550 can be selected and changed by the user 208.

Graph 580 (in FIG. 6) illustrates the percentage of the total bandwidth consumption used by each of the connected communication devices UE1, UE2, UE3, etc., over the selected time interval (such as the last hour of time). The duration of information being viewed in graph 550 can be selected and changed by the user 208.

In one embodiment, the health of level 1 metric parameters of each of the connected devices (communication devices UE1, UE2, UE3, etc.) to the communication management resource 140 (such as D3.1 eMTA), which serves as the home router, is determined based on pre-set threshold values. For example, if total number of packets transmitted and received by a respective connected device is less than 1M data packets in the last hour, the health status of the Total # of packets is set to an indicator such as Green. If the total number packets are equal or greater than 10M packets, the health status indicator is set Red, and Yellow is used to indicate consumption conditions are in between these threshold limits (if between 1M and 10M).

This type of information empower the customer and/or service provider to optimize and track the traffic and usage on own home network without even the need to call a respective agent of the service provider.

Figure 7:
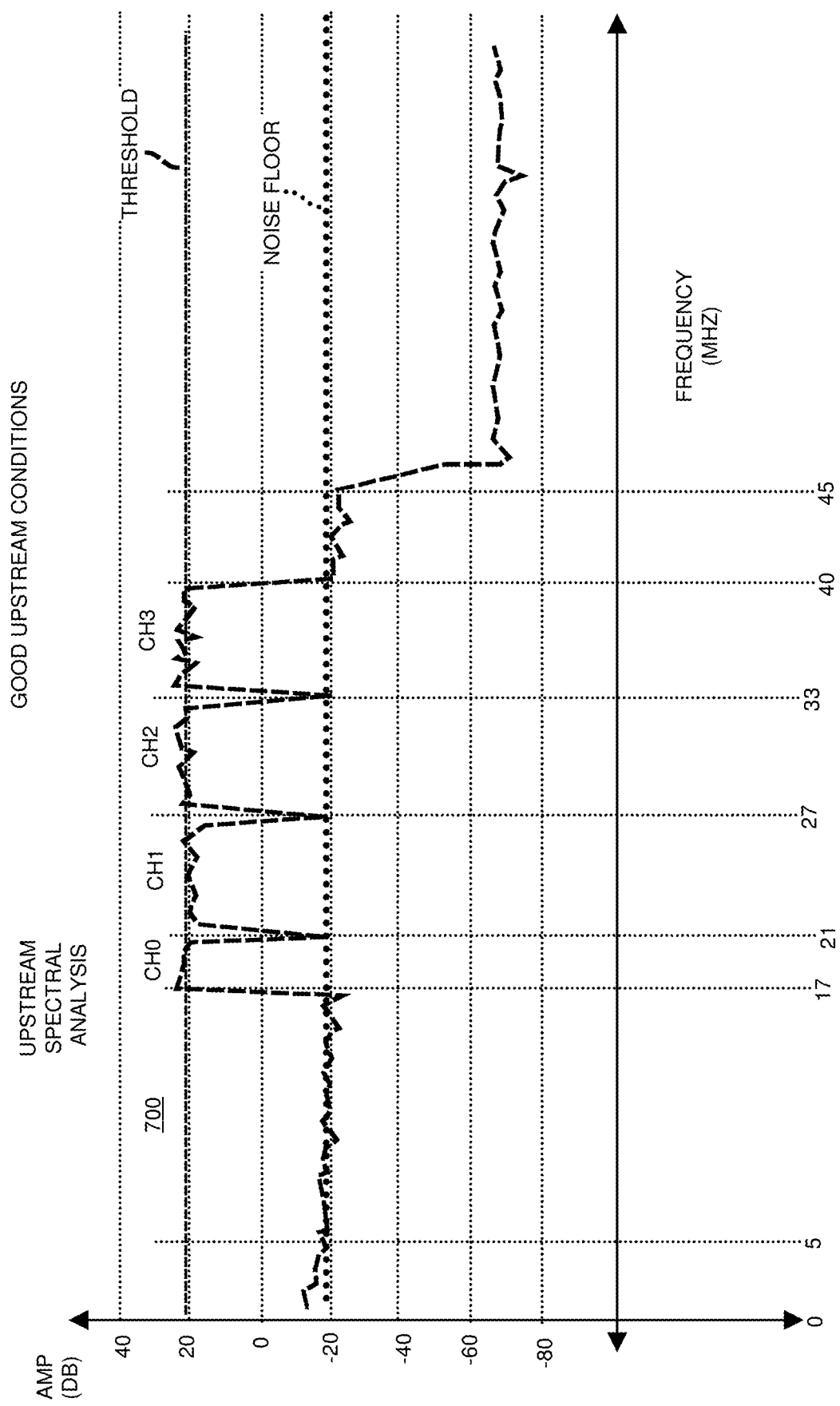
FIG. 7 is an example diagram illustrating display of first spectral information associated with monitoring of a respective communication link in an upstream direction with respect to a gateway in a subscriber domain according to embodiments herein.

FIG. 7 is an example diagram illustrating display of spectral information associated with monitoring of a respective communication link in an upstream direction according to embodiments herein.

As previously discussed, the monitor resource 153 produces spectral information 163 based on monitoring of the uplink and downlink with respect to the communication management resource 140. Based on such spectral information 163 (such as upstream spectral monitoring from port B) as received by the remote management resource 140 from gateway resource 121, any or all such information can be displayed on the display screen 290 for viewing by the respective user 208 (such as a technician) troubleshooting an issue associated with the gateway resource 121 or corresponding supporting network 115 in subscriber domain 150-1.

Graph 700 illustrates an upstream RF spectrum analysis [Power (in dBmV or deciBel milliVolts) vs. frequency (in MHz)] as viewed upstream from port B associated with gateway resource 121. The upstream transmit band is 5 MHz to 45 MHz.

The RF output spectrum analyzer output includes:
1. Noise floor at −20 dBmV
2. The first transmit channel labeled as Channel 0 is a 3.2 MHz wide Single Carrier QAM channel (SC-QAM) using TDMA to support Charter legacy cable modems (D1.1, D2.0, and D3.0) in the network
3. Channel 1 is a 6.4 MHz wide DOCSIS 3.0 SC-QAM; the Carrier to Noise Ratio (CNR) appears to be around 36 dB, sufficient to support 64-QAM modulation.
4. Channel 2 is a 6.4 MHz wide DOCSIS 3.0 SC-QAM (64-QAM modulation).
5. Channel 3 is a 6.4 MHz wide DOCSIS 3.0 SC-QAM (64-QAM modulation).
6. Upper frequency edge of the diplex filter at frequencies above 45 MHz In one embodiment, channels 1, 2, and 3 are bonded channels, which means that acts like a single channel with a width of 3×6.4 MHz=19.2 MHz.

This example illustrates good communications conditions because the peak signal energy/power (at +20 dBmV) is about 40 dB above the noise floor of −20 dBmV. Any communication management resource that sends such spectral information as in graph 700 indicates a good upstream condition (i.e., respective communication link 128 is healthy).

Figure 8:
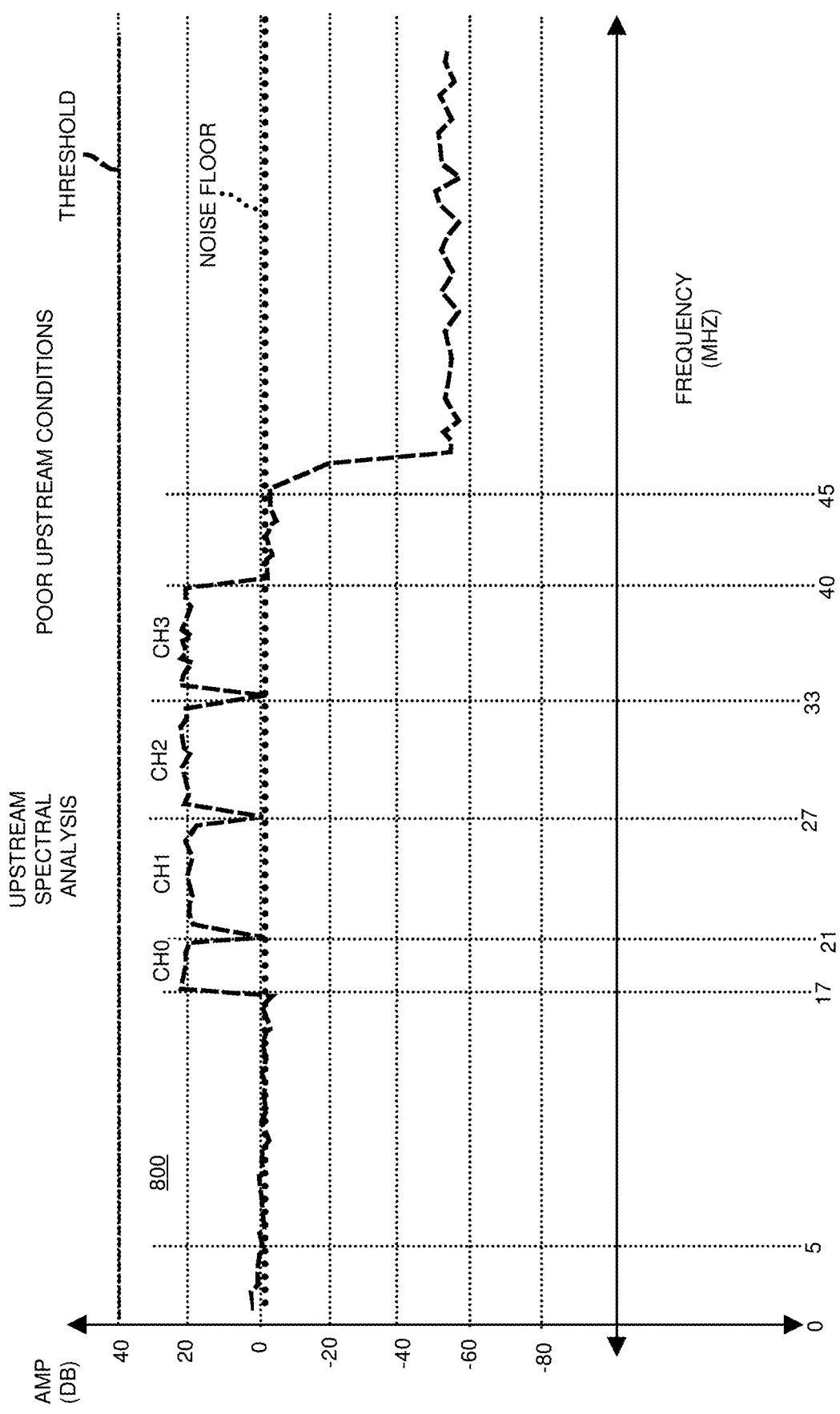
FIG. 8 is an example diagram illustrating display of second spectral information associated with monitoring of a respective communication link in an upstream direction with respect to a gateway in a subscriber domain according to embodiments herein.

FIG. 8 is an example diagram illustrating display of spectral information associated with monitoring of a respective communication link in an upstream direction according to embodiments herein.

In this example embodiment, based on such spectral information 163, as received by the remote management resource 140 from communication management resource 140, any or all such information can be displayed on the display screen 290 (as graph 800) for viewing by the respective user 208 (such as a technician) troubleshooting an issue associated with the gateway resource 121 or corresponding supporting network 115 in subscriber domain 150-1.

Graph 800 illustrates an upstream RF spectrum analysis [Power (in dBmV) vs. frequency (in MHz)] as viewed upstream from port B associated with gateway resource 121. The upstream transmit band is 5 MHz to 45 MHz.

The RF output spectrum analyzer output includes:
1. Noise floor at 0 dBmV
2. The first transmit channel labeled as Channel 0 is a 3.2 MHz wide Single Carrier QAM channel (SC-QAM) using TDMA to support Charter legacy cable modems (D1.1, D2.0, and D3.0) in the network
3. Channel 1 is a 6.4 MHz wide DOCSIS 3.0 SC-QAM; the Carrier to Noise Ratio (CNR) appears to be around 36 dB, sufficient to support 64-QAM modulation.
4. Channel 2 is a 6.4 MHz wide DOCSIS 3.0 SC-QAM (64-QAM modulation).
5. Channel 3 is a 6.4 MHz wide DOCSIS 3.0 SC-QAM (64-QAM modulation).
6. Upper frequency edge of the diplex filter at frequencies above 45 MHz In one embodiment, channels 1, 2, and 3 are bonded channels, which means that acts like a single channel with a width of 3×6.4 MHz=19.2 MHz.

This example illustrates bad or poor communications conditions in network 115 because the peak signal (at +20 dBmV) is only 20 dB above the noise floor of 0 dBmV. Any communication management resource that sends such spectral information as in graph 800 indicates a poor upstream condition and that some aspect of communication link 128 in FIG. 1 may need to be troubleshooted and fixed. Note that the upstream spectrum trace may also include spurious noise and non-linear distortions, which are not illustrated in FIG. 8.

Figure 9:
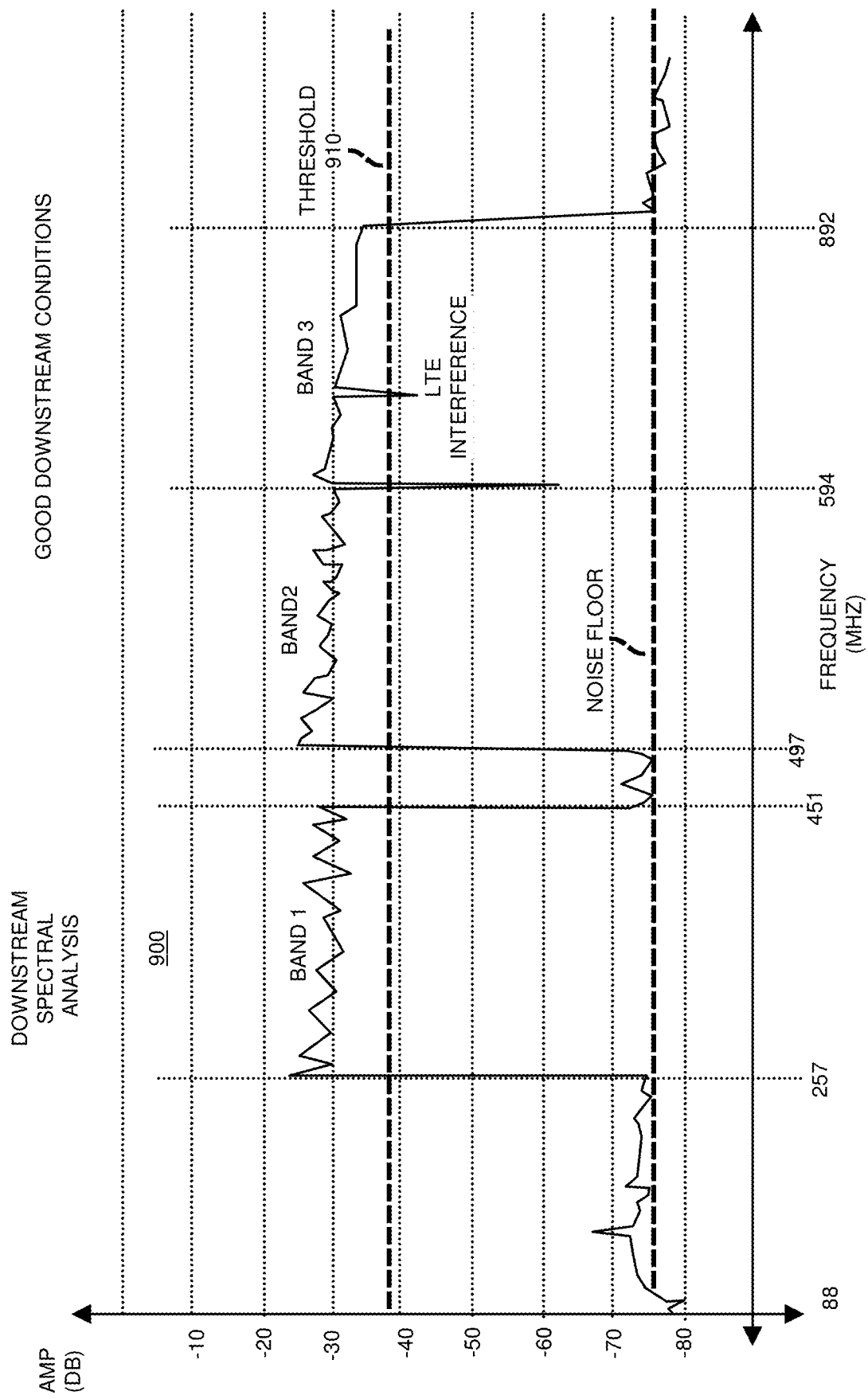
FIG. 9 is an example diagram illustrating display of first spectral information associated with monitoring of a respective communication link in a downstream direction with respect to a gateway in a subscriber domain according to embodiments herein.

FIG. 9 is an example diagram illustrating display of spectral information associated with monitoring of a respective communication link in a downstream direction according to embodiments herein.

Note that, in one embodiment, band 2 and band 3 are separate OFDM channels, each having a 192 MHz channel width. However, band 1 is different. It shows multiple contiguous SC-QAM (Single-Carrier Quadrature Amplitude Modulation) channels with 6 MHz width.

As previously discussed, the monitor resource 153 produces spectral information 163 based on monitoring of the downlink (communication link 127) with respect to the communication management resource 140. Based on such spectral information 163 (such as downstream monitoring from port A) as received from the remote management resource 140, any or all such information can be displayed on the display screen 290 for viewing by the respective user 208 (such as a technician) troubleshooting an issue associated with the gateway resource 121 or corresponding supporting network 115 in subscriber domain 150-1.

Graph 900 illustrates a good downstream condition (communication link 127 is healthy) because the signal power/energy in each of the ranges band 1, band 2, and band 3, is above the threshold value 910. This threshold value may be set for example to support a minimum data throughput in subscriber domain 150-1.

Figure 10:
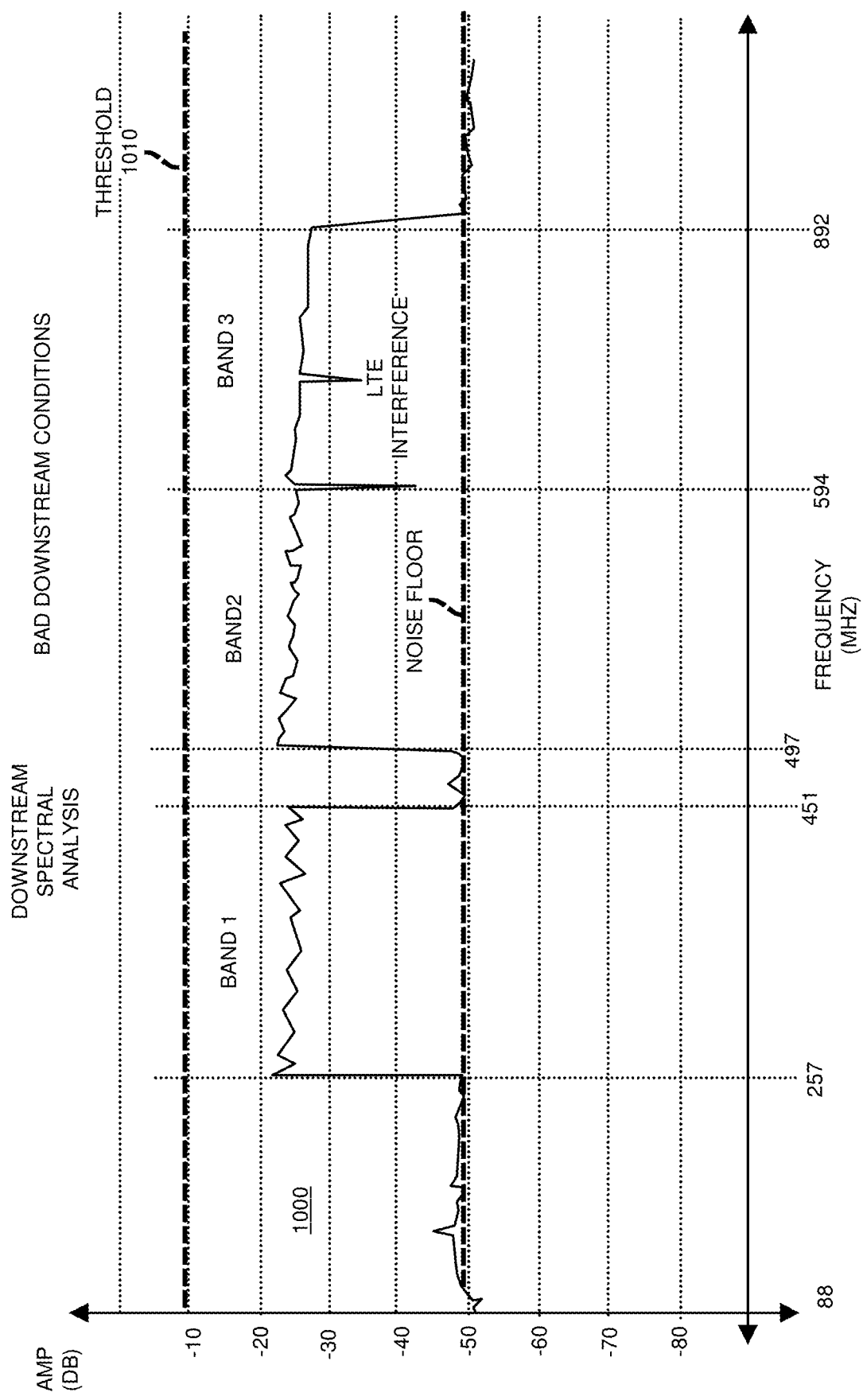
FIG. 10 is an example diagram illustrating display of second spectral information associated with monitoring of a respective communication link in a downstream direction with respect to a gateway in a subscriber domain according to embodiments herein.

FIG. 10 is an example diagram illustrating display of spectral information associated with monitoring of a respective communication link in a downstream direction according to embodiments herein.

Based on such spectral information 163 (such as downstream monitoring from port A) as received from the remote management resource 140, any or all such information can be displayed on the display screen 290 for viewing by the respective user 208 (such as a technician) troubleshooting an issue associated with the gateway resource 121 or corresponding supporting network 115 in subscriber domain 150-1.

Graph 1000 illustrates a poor downstream condition (communication link 127 is unhealthy) because the signal energy in each of the ranges band 1, band 2, and band 3, is below the threshold value 1010.

Figure 11:
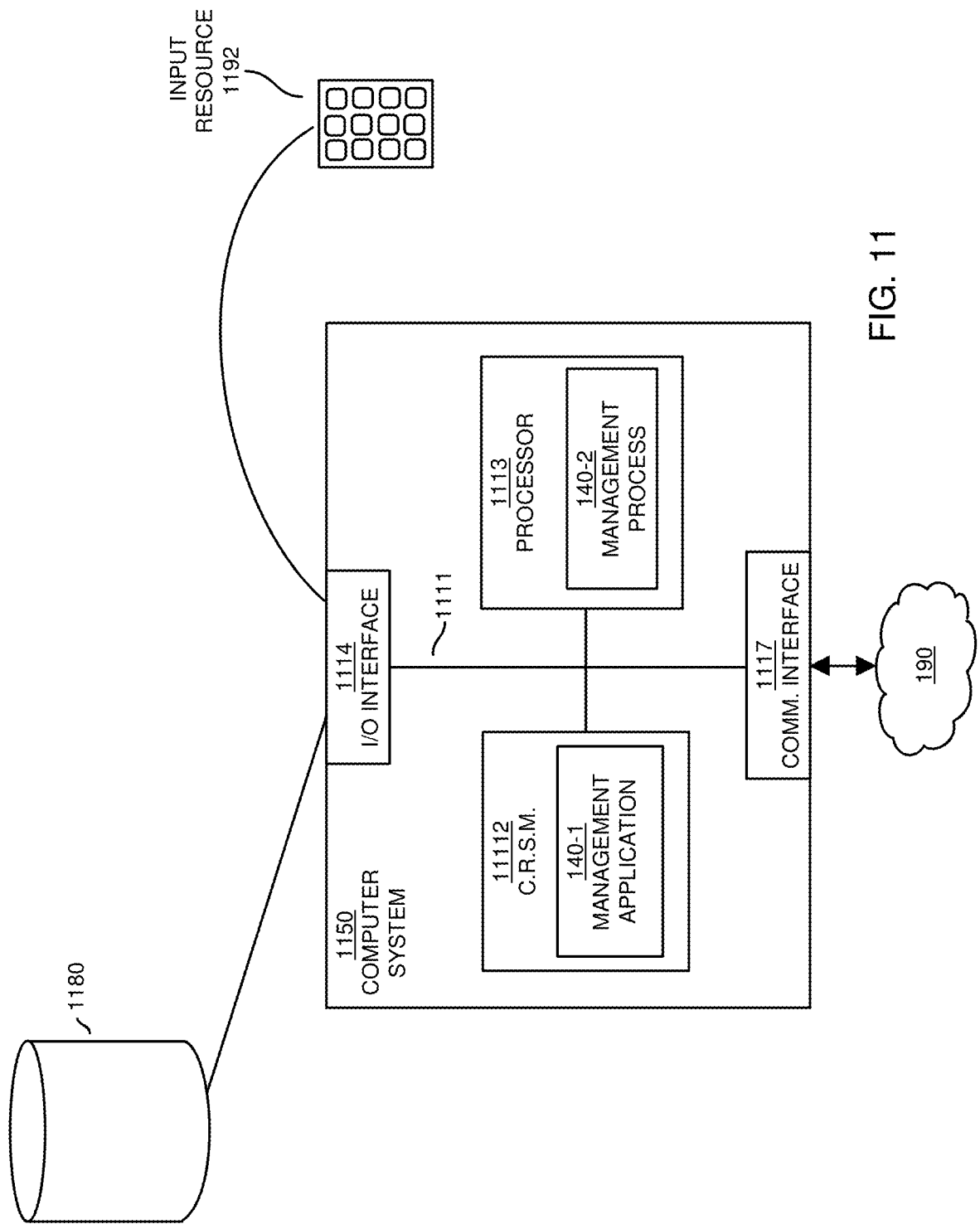
FIG. 11 is an example diagram illustrating example computer hardware and software operable to execute operations according to embodiments herein.

FIG. 11 is an example block diagram of a computer system for implementing any of the operations as previously discussed according to embodiments herein.

Note that any of the resources (such as communication devices, user equipment, wireless stations, wireless base stations, communication management resource, remote management resource 160, etc.) as discussed herein can be configured to include computer processor hardware and/or corresponding executable instructions to carry out the different operations as discussed herein.

For example, as shown, computer system 1150 of the present example includes interconnect 1111 coupling computer readable storage media 1112 such as a non-transitory type of media (which can be any suitable type of hardware storage medium in which digital information can be stored and or retrieved), a processor 1113 (computer processor hardware), I/O interface 1114, and a communications interface 1117.

I/O interface(s) 1114 supports connectivity to repository 1180 and input resource 1192.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with management application 140-1 (e.g., including instructions) in a respective node (such as communication management resource, monitor resources, remote management resource, etc.) to carry out any of the operations as discussed herein.

During operation of one embodiment, processor 1113 accesses computer readable storage media 1112 via the use of interconnect 1111 in order to launch, run, execute, interpret or otherwise perform the instructions in management application 140-1 stored on computer readable storage medium 1112. Execution of the management application 140-1 produces management process 140-2 to carry out any of the operations and/or processes as discussed herein.

Those skilled in the art will understand that the computer system 1150 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1150 may reside at any location or can be included in any suitable resource in any network environment to implement functionality as discussed herein.

Functionality supported by the different resources will now be discussed via flowcharts in FIGS. 12 and 13. Note that the steps in the flowcharts below can be executed in any suitable order.

Figure 12:
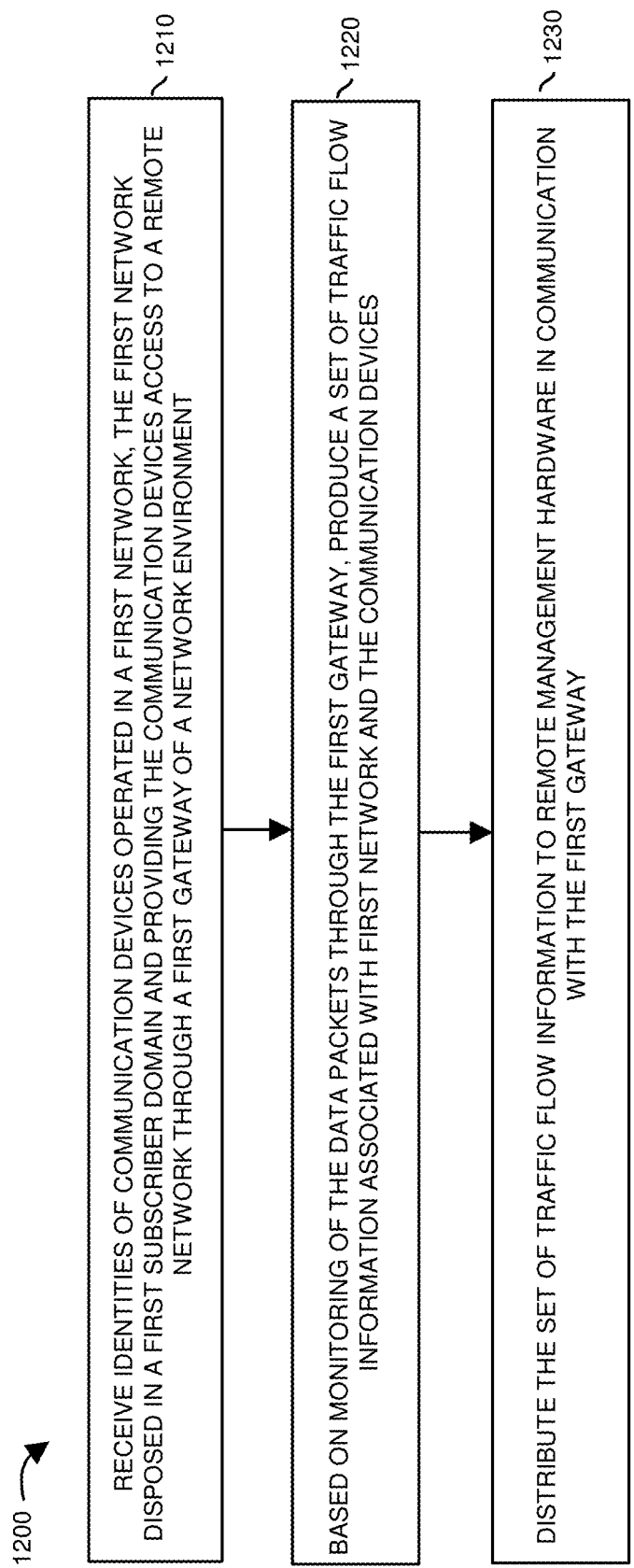
FIG. 12 is an example diagram illustrating a method of collecting and distributing data associated with a subscriber domain according to embodiments herein.

FIG. 12 is a flowchart 1200 illustrating an example method according to embodiments herein. Note that there will be some overlap with respect to concepts as discussed above.

In processing operation 1210, the communication management resource 140 receives identities of communication devices (such as user equipment UE1, UE2, UE3, etc., access point AP1 131, AP2 132, AP3 132, etc.) operated in a first network 115 disposed in subscriber domain 151 and providing the communication devices access to a remote network 190 through a first gateway resource 121 of the network environment 100.

In processing operation 1220, based on monitoring of the data packets through the first gateway resource 121, the monitor resource 151 associated with communication management resource 140 produces a set of traffic flow information 161 associated with first network 115 and the communication devices.

In processing operation 1230, the communication management resource 140 distributes the set of traffic flow information 161 to the remote management resource 160 in communication with the first gateway resource 121.

Additional operations associated with methods herein are discussed above in other FIGS.

Figure 13:
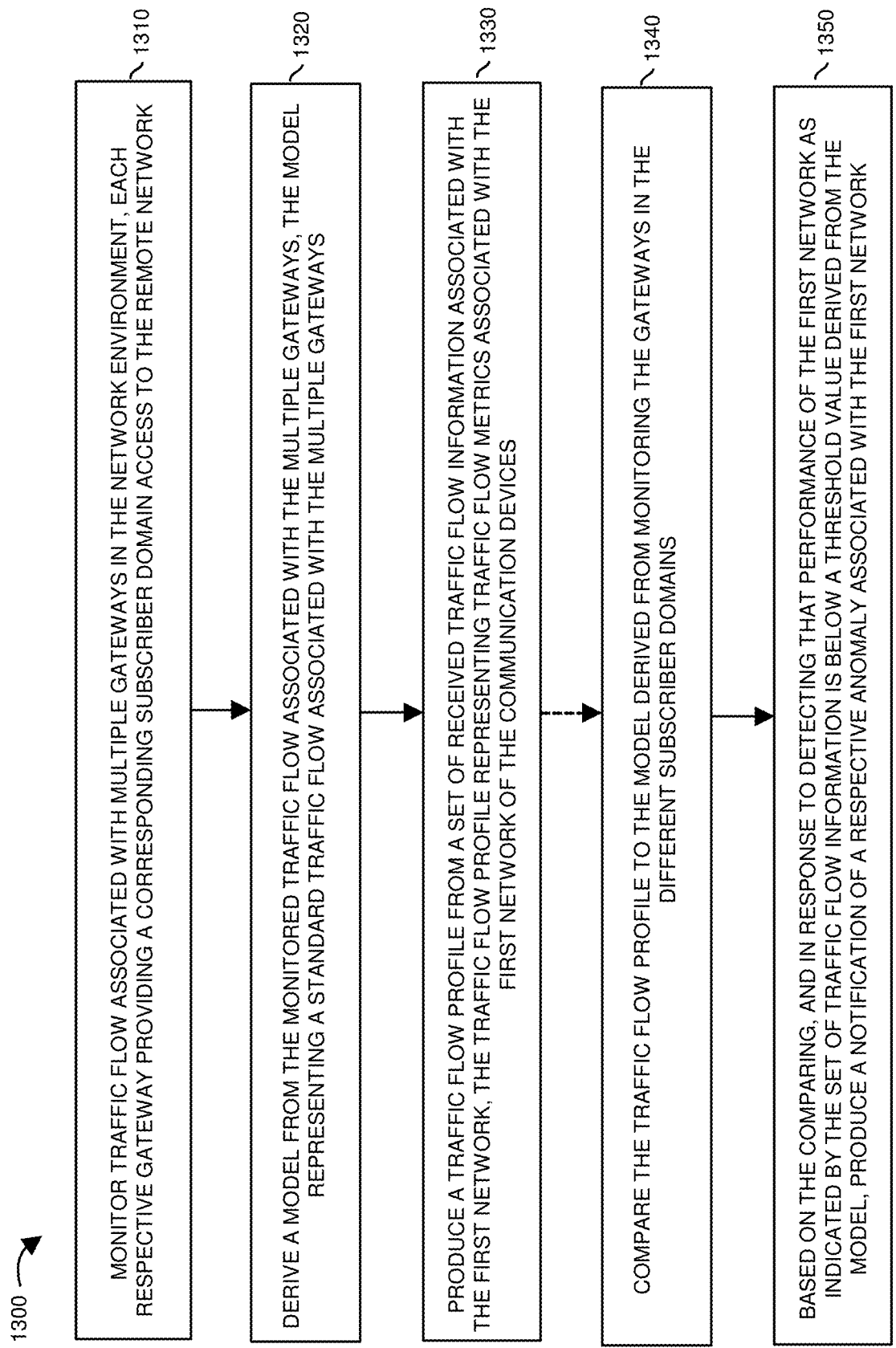
FIG. 13 is an example diagram illustrating a method of analyzing data according to embodiments herein.

FIG. 13 is a flowchart 1300 illustrating an example method according to embodiments herein. Note that there will be some overlap with respect to concepts as discussed above.

In processing operation 1310, the remote management resource 160 monitors traffic flow associated with multiple gateways (such as gateway 121, gateway 122, etc.) in the network environment 100. Each respective gateway provides a corresponding subscriber domain access to the remote network.

In processing operation 1320, the remote management resource 160 derives a model from the monitored traffic flow associated with the multiple gateways. In one embodiment, the generated model 260-1 represents or captures a standard or expected traffic flow associated with the multiple gateways.

In processing operation 1330, the remote management resource 160 produces a traffic flow profile from the set of traffic flow information 161 associated with the first network 115. The traffic flow profile represents traffic flow metrics associated with the first network 115 of the communication devices UE1, UE2, etc.

In processing operation 1340, the remote management resource 160 compares the traffic flow profile to the model derived from monitoring the gateways 121, 122, 123, etc., in the different subscriber domains.

In processing operation 1350, based on the comparing, and in response to detecting that performance of the first network as indicated by the set of traffic flow information 161 is below a threshold value derived from the model, the remote management resource 160 produces a notification of a respective anomaly associated with the first network 115.

Additional operations associated with methods herein are discussed above in other FIGS.

Note again that techniques herein are well suited to facilitate collection of information associated with one or more communication devices and distribution of such information over a network to a communication management resource. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    receiving identities of communication devices operated in a first network, the first network disposed in a first subscriber domain and providing the communication devices access to a remote network through a first gateway of a network environment;
    based on monitoring of data packets through the first gateway, producing a set of traffic flow information associated with the first network and the communication devices, the traffic flow information including a first spectral analysis of communications transmitted in a downlink from the first gateway to the communication devices;

distributing the set of traffic flow information to remote management hardware in communication with the first gateway;

wherein the first spectral analysis includes a first graph including a first signal indicating an amplitude of communications transmitted in the downlink from the first gateway to the communication devices over first channels of a shared communication link; and wherein the first graph includes a noise floor reference and threshold level with respect to the first signal, the combination of the first signal with respect to the noise floor reference and the threshold level indicating a quality of communicating in a downlink direction from the first gateway to the communication devices.

2. The method as in claim 1 further comprising:
receiving control input, the control input indicating a test to be performed in the first network via the first gateway;
in response to receiving the control input, at the first gateway, executing the test as specified by the control input; and
communicating results of the test from the first gateway to a remote destination.

3. The method as in claim 1 further comprising:
monitoring traffic flow associated with multiple gateways in the network environment, each of the multiple gateways providing a corresponding subscriber domain access to the remote network;
deriving a model from the monitored traffic flow associated with the multiple gateways, the model representing a model traffic flow associated with the multiple gateways; and
producing a traffic flow profile from the set of traffic flow information associated with the first network, the traffic flow profile representing flow of data packets associated with the first network of the communication devices.

4. The method as in claim 1 further comprising:
analyzing the set of traffic flow information;
via analysis of the traffic flow information, determining a health status of the first network; and
in response to detecting that the health status of the first network is below a threshold value, producing an alert indicating the health status of the first network.

5. The method as in claim 1, wherein monitoring of the data packets includes:
tracking a latency associated with communicating first data packets from the first gateway to each of the communication devices; and
tracking a bandwidth consumption associated with communicating second data packets to the communication devices.

6. The method as in claim 1 further comprising:
at the first gateway, in response to communications with the communication devices in the subscriber domain, generating alias information associated with each of the communication devices; and
from the first gateway, providing the received alias information associated with each of the communication devices to the remote management hardware.

7. The method as in claim 1 further comprising:
storing the set of traffic flow information, the set of traffic flow information including collected data associated with the communication devices; and
storing metadata associated with the traffic flow information, the metadata supporting translation of the collected data.

8. The method as in claim 1, wherein the remote management hardware provides a viewable rendition of the set of traffic flow information to a respective technician analyzing operation of the first network.

9. The method as in claim 1, wherein the first channels reside in a range between 257 and 892 megahertz.

10. A system comprising:
a first gateway operable to:
  receive identities of communication devices operated in a first network, the first network disposed in a first subscriber domain and providing the communication devices access to a remote network through the first gateway of a network environment;
  based on monitoring of data packets through the first gateway, produce a set of traffic flow information associated with first network and the communication devices, the traffic flow information including a first spectral analysis of communications transmitted in a downlink from the first gateway to the communication devices; and
  communicate the set of traffic flow information to remote management hardware in communication with the first gateway;
  wherein the first spectral analysis includes a first graph including a first signal indicating an amplitude of communications transmitted in the downlink from the first gateway to the communication devices over first channels of a shared communication link; and
  wherein the first graph includes a noise floor reference and threshold level with respect to the first signal, the combination of the first signal with respect to the noise reference and the threshold level indicating a quality of communicating in a downlink direction from the first gateway to the communication devices.

11. The system as in claim 10, wherein the first gateway is further operative to:
receive control input, the control input indicating a test to be performed in the first network via the first gateway;
in response to receiving the control input, at the first gateway, execute the test as specified by the control input; and
communicate results of the test from the first gateway to a remote destination.

12. The system as in claim 10 further comprising:
a remote management resource operable to:
  monitor traffic flow associated with multiple gateways in the network environment, each of the multiple gateways providing a corresponding subscriber domain access to the remote network;
  derive a model from the monitored traffic flow associated with the multiple gateways, the model representing a model traffic flow associated with the multiple gateways; and
  produce a traffic flow profile from the set of traffic flow information associated with the first network, the traffic flow profile representing flow of data packets associated with the first network of the communication devices.

13. The system as in claim 12, wherein the first gateway is further operative to:

compare the traffic flow profile to the model derived from monitoring the multiple gateways in the different subscriber domains;

based on the comparing, and in response to detecting that performance of the first network as indicated by the set of traffic flow information is below a threshold value derived from the model, produce a notification of a respective anomaly associated with the first network; and wherein the notification indicates an anticipated failure associated with the first network monitored by the first gateway.

14. The system as in claim 10 further comprising:
a remote management resource operable to:
analyze the set of traffic flow information;
via analysis of the traffic flow information, determine a health status of the first network; and
in response to detecting that the health status of the first network is below a threshold value, produce an alert indicating the health status of the first network.

15. The system as in claim 10, wherein the first gateway is further operative to:
track a latency associated with communicating first data packets from the first gateway to each of the communication devices; and
track a bandwidth consumption associated with communicating second data packets to the communication devices.

16. The system as in claim 10, wherein the first gateway is further operative to:
in response to communications with the communication devices in the subscriber domain, generate alias information associated with each of the communication devices; and
provide the received alias information associated with each of the communication devices to the remote management hardware.

17. The system as in claim 10 further comprising:
a remote management resource operable to:
store the set of traffic flow information, the set of traffic flow information including collected data associated with the communication devices; and
store metadata associated with the traffic flow information, the metadata supporting translation of the collected data.

18. The system as in claim 10, wherein the remote management hardware provides a viewable rendition of the set of traffic flow information to a respective technician analyzing operation of the first network.

19. Computer-readable storage hardware having instructions stored thereon, the instructions, when carried out by computer processor hardware, cause the computer processor hardware to:
receive identities of communication devices operated in a first network, the first network disposed in a first subscriber domain and providing the communication devices access to a remote network through a first gateway of a network environment;
based on monitoring of the data packets through the first gateway, produce a set of traffic flow information associated with first network and the communication devices, the traffic flow information including a first spectral analysis of communications transmitted in a downlink from the first gateway to the communication devices;

distribute the set of traffic flow information to remote management hardware in communication with the first gateway;

wherein the first spectral analysis includes a first graph including a first signal indicating an amplitude of communications transmitted in the downlink from the first gateway to the communication devices over first channels of a shared communication link; and wherein the first graph includes a noise floor reference and threshold level with respect to the first signal, the combination of the first signal with respect to the noise floor reference and the threshold level indicating a quality of communicating in a downlink direction from the first gateway to the communication devices.

20. The method as in claim 1, wherein the set of traffic flow information is available to a subscriber in the first subscriber domain for analyzing the first network.

21. The method as in claim 1, wherein the traffic flow information further includes a second spectral analysis of communications transmitted in an uplink from the first gateway to the remote network.

22. The method as in claim 21, wherein the traffic flow information includes and a second graph, the second graph representing the second spectral analysis and including a second signal indicating an amplitude of the communications transmitted in the uplink from the first gateway to the remote network over second channels of the shared communication link.

23. The method as in claim 22, wherein the first graph includes partitions between the first channels; and
wherein the second graph includes partitions between the second channels.

24. The method as in claim 22, wherein the first channels reside in a first range between 257 and 892 megahertz; and
wherein the second channels reside in a second range between 5 and 45 megahertz.

25. The method as in claim 24,
wherein the second graph includes a second noise floor reference with respect to the second signal, the combination of the second signal with respect to the second noise floor reference indicating a quality of communicating in the uplink from the first gateway to the remote network.

26. The method as in claim 25,
wherein the second graph includes a second threshold level with respect to the second noise floor reference, the combination of the second signal with respect to the second threshold level indicating a quality of communicating in the uplink from the first gateway to the remote network.

27. The method as in claim 25 further comprising:
monitoring traffic flow associated with multiple gateways in the network environment, each of the multiple gateways providing a corresponding subscriber domain access to the remote network, the multiple gateways including the first gateway;
deriving a model from the monitored traffic flow associated with the multiple gateways, the model representing a model traffic flow associated with the multiple gateways; and
producing a traffic flow profile from the set of traffic flow information associated with the first network, the traffic flow profile representing flow of the data packets associated with the first network of the communication devices.

28. The method as in claim 27 further comprising:
 comparing the traffic flow profile to the model derived from monitoring the multiple gateways in the different subscriber domains; and
 based on the comparing, and in response to detecting that performance of the first network as indicated by the set of traffic flow information is below a threshold value derived from the model, producing a notification of a respective anomaly associated with the first network.

29. The method as in claim 28, wherein the notification indicates an anticipated failure associated with the first network monitored by the first gateway.

* * * * *